United States Patent
Ma et al.

(10) Patent No.: US 8,159,466 B2
(45) Date of Patent: Apr. 17, 2012

(54) TOUCH PANEL AND PORTABLE ELECTRONIC DEVICE THEREOF

(75) Inventors: Mei-Sheng Ma, Hsinchu (TW);
Hsin-Hung Lee, Hsinchu (TW);
Yao-Jen Hsieh, Hsinchu (TW);
Yung-Hsien Ho, Hsinchu (TW);
Heng-Sheng Chou, Hsinchu (TW);
Chun-Huai Li, Hsinchu (TW);
Meng-Hsiang Chang, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 608 days.

(21) Appl. No.: 12/358,220

(22) Filed: Jan. 22, 2009

(65) Prior Publication Data
US 2009/0278810 A1    Nov. 12, 2009

(30) Foreign Application Priority Data
May 9, 2008  (TW) .............................. 97117177 A

(51) Int. Cl.
*G06F 3/041* (2006.01)
(52) U.S. Cl. ......................................................... 345/173
(58) Field of Classification Search .................... None
See application file for complete search history.

(56) References Cited

U.S. PATENT DOCUMENTS

| | | | |
|---|---|---|---|
| 6,995,743 B2 | 2/2006 | Boer et al. | |
| 2008/0174706 A1* | 7/2008 | Kwon et al. | 349/12 |
| 2009/0115735 A1* | 5/2009 | Chuang | 345/173 |
| 2009/0225047 A1* | 9/2009 | Lee et al. | 345/173 |

* cited by examiner

*Primary Examiner* — Christopher R Lamb
(74) *Attorney, Agent, or Firm* — Jianq Chyun IP Office

(57) ABSTRACT

A touch panel and a portable electronic device thereof are provided. The present invention can accurately determine a position touched by a user on the touch panel by judging whether or not a potential voltage value between a reference capacitor and a sensing capacitor of a pixel having a sensing area being changed, or to determine whether a switch of a pixel having the sensing area being conducted.

6 Claims, 6 Drawing Sheets

TOUCH PANEL AND PORTABLE ELECTRONIC DEVICE THEREOF

CROSS-REFERENCE TO RELATED APPLICATION

This application claims the priority benefit of Taiwan application serial no. 97117177, filed on May 9, 2008. The entirety of the above-mentioned patent application is hereby incorporated by reference herein and made a part of specification.

BACKGROUND OF THE INVENTION

1. Field of the Invention

The present invention relates to a portable electronic device. More particularly, the present invention relates to a portable electronic device having a touch panel.

2. Description of Related Art

With quick development of technology, potable electronic devices, such as personal digital assistant (PDA) mobile phones, have gradually become indispensable electronic products in people's daily life. Generally, a present PDA mobile phone has a touch panel, so that a user can directly operate the PDA mobile phone via a stylus or fingers. However, since the touch panel of the PDA mobile phone is generally a press touch panel formed by stacking a display, for example, a thin-film transistor liquid crystal display (TFT-LCD), and a touch panel, the touch panel fabricated based on such method has disadvantages of low display luminance and increasing of a thickness of the display.

Therefore, as to a portable electronic device requiring design features of lightness, slimness, shortness and smallness, a conventional method for fabricating the touch panel may lead to increasing of a whole thickness of the PDA mobile phone, and accordingly competitiveness of such PDA mobile phones is decreased. To effectively solve the disadvantages of the conventional touch panels, a light sensitive display disclosed by Boer et al. in U.S. Pat. No. 6,995,743 is provided, in which by integrating the touch panel with the display, and by sensing a shadow on the touch panel caused by operation of the stylus or finger, a position touched by the user on the touch panel is determined.

However, since the light sensitive display provided by Boer et al. has to utilize a charge readout amplifier to charge pixels irradiated with light, a signal on a readout line thereof is liable to be influenced, and accordingly a signal to noise ratio (S/N ratio) of the signal on the readout line is decreased, so that the light sensitive display provided by Boer et al. may misjudge or even cannot judge the position touched by the user on the touch panel.

SUMMARY OF THE INVENTION

Accordingly, the present invention is directed to a touch panel and a portable electronic device using the same, in which a conventional charge readout amplifier is not required in the touch panel provided by the present invention. Therefore, interference of signals on a readout line can be avoided, so that a position touched by a user on the touch panel can be accurately judged.

The present invention provides a touch panel including a first substrate, a plurality of pixel structures, a second substrate, a black matrix layer, a spacer and a common electrode. The pixel structures are arranged on the first substrate in an array, and at least one first pixel structure in each M×N pixel structures has a first sensing area, where M and N are positive integers.

The first pixel structure includes an active device and a sensing electrode. The active device is disposed on the first substrate and is located at the first sensing area, wherein the active device is electrically connected to a scan line and a readout line, and is covered by a passivation layer. The sensing electrode is disposed on the passivation layer and is located at the first sensing area. The sensing electrode is electrically connected to the readout line through the active device, and a portion of the scan line is located between the first sensing area and the sensing electrode to form a reference capacitor.

The second substrate has a second sensing area corresponding to the first sensing area. The black matrix layer is disposed on the second substrate and is located at the second sensing area. The spacer is disposed on the black matrix layer and is located at the second sensing area. The common electrode covers a portion of the black matrix layer and the spacer, wherein there is a pitch between the common electrode on the spacer and the sensing electrode to form a sensing capacitor.

In an embodiment of the present invention, the active device includes a gate, a channel layer, an ohmic contact layer, a source and a drain. The gate is disposed on the first substrate and is located at the first sensing area. The gate is also electrically connected to the scan line and is covered by an insulation layer. The channel layer is disposed on the insulation layer covering the gate. The ohmic contact layer is disposed at two sides on the channel layer, and is further disposed between the channel layer and the source, and between the channel layer and the drain. The source is electrically connected to the readout line, and the drain is electrically connected to the sensing electrode.

The present invention provides a touch panel including a first substrate, a plurality of pixel structures, a second substrate, a black matrix layer, a spacer and a floating electrode. The pixel structures are arranged on the first substrate in an array, and at least one first pixel structure in each M×N pixel structures has a first sensing area, wherein M and N are positive integers.

The first pixel structure includes an active device, a first sensing electrode and a second sensing electrode. The active device is disposed on the first substrate and is located at the first sensing area, wherein the active device is electrically connected to a scan line and a readout line, and is covered by a passivation layer. The first sensing electrode is disposed on the passivation layer and is located at the first sensing area, and the first sensing electrode is electrically connected to the readout line through the active device.

The second sensing electrode is disposed on the passivation layer and is located at the first sensing area, wherein a portion of the scan line is located between the first sensing area and the second sensing electrode and is electrically connected to the second sensing electrode. The second substrate has a second sensing area corresponding to the first sensing area. The black matrix layer is disposed on the second substrate and is located at the second sensing area. The spacer is disposed on the black matrix layer and is located at the second sensing area. The floating electrode covers a portion of the black matrix layer and the spacer located at the second sensing area, wherein the floating electrode on the spacer respectively has a same pitch relative to vertical directions of the first sensing electrode and the second sensing electrode.

In an embodiment of the present invention, the active device includes a gate, a channel layer, an ohmic contact layer, a source and a drain. The gate is disposed on the first substrate and is located at the first sensing area. The gate is also electrically connected to the scan line and is covered by an insulation layer. The channel layer is disposed on the insulation layer covering the gate. The ohmic contact layer is disposed at two sides on the channel layer, and is further disposed between the channel layer and the source, and between the channel layer and the drain. The source is electrically connected to the readout line, and the drain is electrically connected to the first sensing electrode.

In another embodiment of the present invention, the active device includes a gate, a channel layer, an ohmic contact layer, a source and a drain. The gate is disposed on the first substrate and is located at the first sensing area. The gate is also electrically connected to the scan line, and a portion thereof is covered by an insulation layer. The channel layer is disposed on the insulation layer covering the gate. The ohmic contact layer is disposed at two sides on the channel layer, and is further disposed between the channel layer and the source, and between the channel layer and the drain. The source is electrically connected to the readout line, and the drain is electrically connected to the first sensing electrode and the second gate.

The present invention provides a touch panel including a plurality of pixel circuits arranged in an array, wherein at least one first pixel circuit in each M×N (M and N are positive integers) pixel circuits includes an active device, a reference capacitor and a sensing capacitor. The active device has a gate, a source and a drain. The gate is electrically connected to a scan line, and the source is electrically connected to a readout line. The reference capacitor is electrically connected between the scan line and the drain. The sensing capacitor is electrically connected between the drain and a common electrode.

In an embodiment of the present invention, when a voltage value divided between the reference capacitor and the sensing capacitor of the first pixel circuit is changed, it represents an area formed by the M×N pixel circuits is a touched position of the touch panel.

The present invention provides a touch panel including a plurality of pixel circuits arranged in an array, wherein at least one first pixel circuit in each M×N (M and N are positive integers) pixel circuits includes an active device and a switch. The active device has a gate, a source and a drain. The gate is electrically connected to a scan line, and the source is electrically connected to a readout line. One terminal of the switch is electrically connected to the drain, and another terminal of the switch is electrically connected to the scan line. When the switch of the first pixel circuit is conducted, it represents an area formed by the M×N pixel circuits is a touched position of the touch panel.

The present invention provides a touch panel including a plurality of pixel circuits arranged in an array, wherein at least one first pixel circuit in each M×N (M and N are positive integers) pixel circuits includes an active device and a switch. The active device has a gate, a source and a drain, wherein the gate is electrically connected to the drain, and the source is electrically connected to a readout line. One terminal of the switch is electrically connected to the drain, and another terminal of the switch is electrically connected to a scan line. When the switch of the first pixel circuit is conducted, it represents an area formed by the M×N pixel circuits is a touched position of the touch panel.

The present invention provides a portable electronic device having any of the aforementioned touch panels.

According to the present invention, the conventional charge readout amplifier is not required in any of the touch panels provided by the present invention, and a position touched by a user on the touch panel can be accurately determined only by judging whether or not a voltage value between a reference capacitor and a sensing capacitor of a pixel having a sensing area is changed, or whether or not a switch of the pixel having the sensing area is conducted. Therefore, the touch panel provided by the present invention can not only effectively resolve disadvantages of the conventional touch panel, but also the potable electronic device using any of the touch panels provided by the present invention has the design features of lightness, slimness, shortness and smallness, so that competitiveness of the products is improved.

In order to make the aforementioned and other objects, features and advantages of the present invention comprehensible, a preferred embodiment accompanied with figures is described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
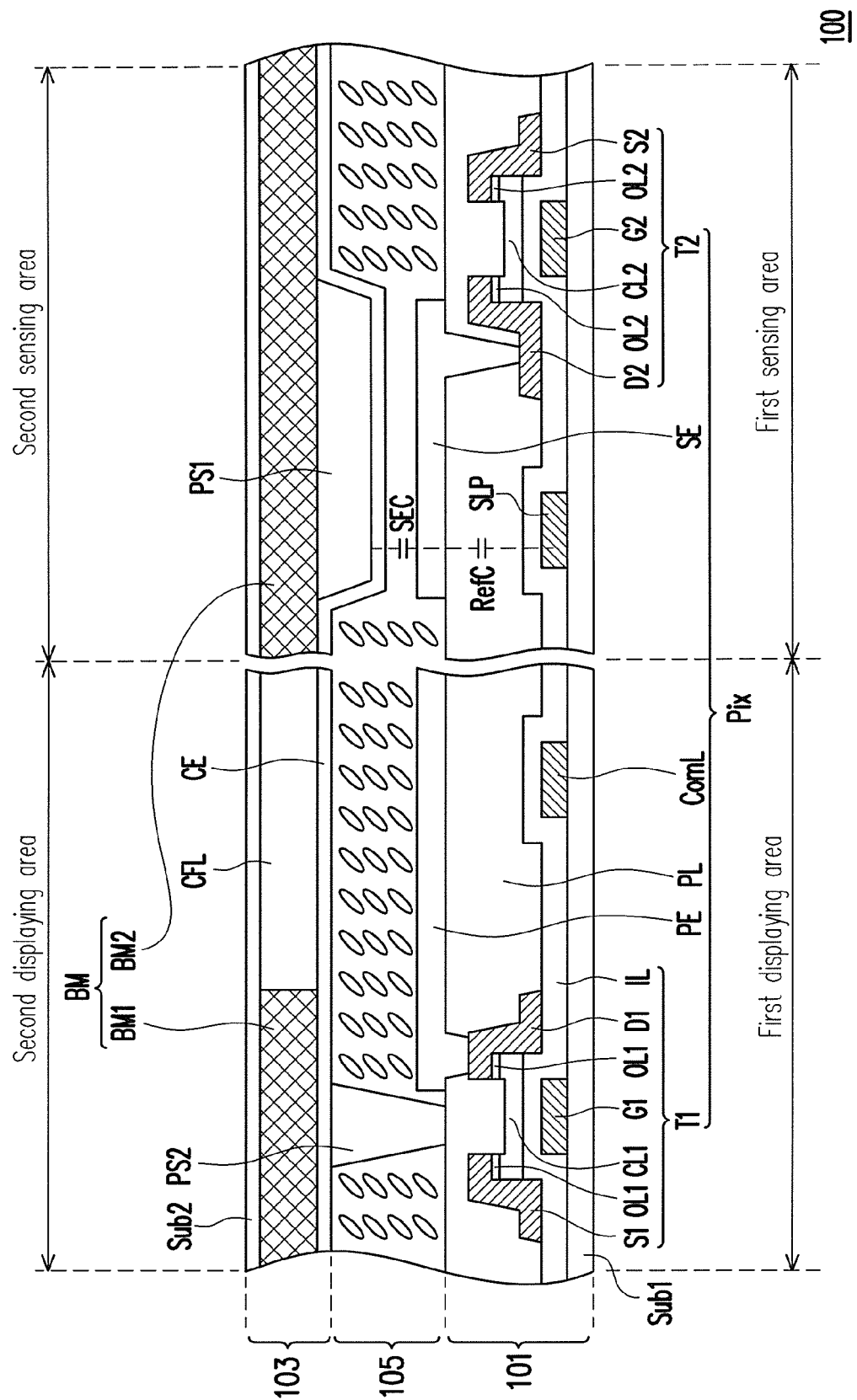
FIG. 1 is a cross-sectional view of a touch panel 100 according to a first embodiment of the present invention.

FIG. 1 is a cross-sectional view of a touch panel 100 according to a first embodiment of the present invention. Referring to FIG. 1, the touch panel 100 includes an active device array substrate 101, for example, a thin film transistor (TFT) array substrate, an opposite substrate 103 and a liquid crystal layer 105. The active device array substrate 101 includes a first substrate Sub1 and a plurality of pixel structures disposed on the first substrate Sub1 in an array.

In the present embodiment, at least one first pixel structure Pix in each M×N pixel circuits has a first displaying area and a first sensing area, where M and N are positive integers, and the other pixel structures can only have the first displaying area, though the present invention is not limited thereto. For example, if a resolution of the touch panel 100 is assumed to be 1024×768, each 6×4 pixel structures is then assumed to have at least one first pixel structure Pix shown as FIG. 1, and the first pixel structure Pix is approximately disposed at a center of an area formed by the 6×4 pixel structures. However, the spirit of the present invention is not limited to the aforementioned assumptions, and the assumptions can be changed according to actual requirements.

The first pixel structure Pix includes a first active device T1, a passivation layer PL, a pixel electrode PE with material thereof being indium tin oxide (ITO), a second active device T2, a sensing electrode SE with material thereof being ITO, and a common line ComL. The first active device T1 is disposed on the first substrate Sub1 and is located at the first displaying area. The first active device T1 includes a first gate G1, an insulation layer IL, a first channel layer CL1, a first ohmic contact layer OL1, a first source S1 and a first drain D1. The first gate G1 is disposed on the first substrate Sub1 and is located at the first displaying area, and the first gate G1 is further electrically connected to a scan line (not shown).

The insulation layer IL covers the first gate G1, the scan line, a portion of the first substrate Sub1 and the common line ComL, wherein the common line ComL is disposed on the first substrate Sub1 and is located at the first displaying area. The first channel layer CL1 is disposed on the insulation layer IL covering the first gate G1. The first ohmic contact layer OL1 is disposed at two sides on the first channel layer CL1. In detail, the first ohmic contact layer OL1 is disposed between the first channel layer CL1 and the first source S1, and between the first channel layer CL1 and the first drain D1. The first source S1 is electrically connected to a data line (not shown), and the first drain D1 is electrically connected to the pixel electrode PE.

The passivation layer PL covers the first active device T1, and the pixel electrode PE is disposed on the passivation layer PL and is located at the first displaying area. The second active device T2 is disposed on the first substrate Sub1 and is located at the first sensing area. The second active device T2 is electrically connected to the scan line and a readout line (not shown), and the passivation layer PL also covers the second active device T2. The sensing electrode SE is disposed on the passivation layer PL and is located at the first sensing area. The sensing electrode SE is electrically connected to the readout line through the second active device T2, and a portion of the scan line SLP is located between the first sensing area and the sensing electrode SE, so as to form a reference capacitor RefC.

In the present embodiment, the second active device T2 includes a second gate G2, a second channel layer CL2, a second ohmic contact layer OL2, a second source S2 and a second drain D2. The second gate G2 is disposed on the first substrate Sub1 and is located at the first sensing area, and the second gate G2 is also electrically connected to the scan line, and the insulation layer IL also covers the second gate G2.

The second channel layer CL2 is disposed on the insulation layer IL covering the second gate G2. The second ohmic contact layer OL2 is disposed at two sides on the second channel layer CL2. In detail, the second ohmic contact layer OL2 is disposed between the second channel layer CL2 and the second source S2, and between the second channel layer CL2 and the second drain D2. The second source S2 is electrically connected to the readout line, and the second drain D2 is electrically connected to the sensing electrode SE.

The opposite substrate 103 includes a second substrate Sub2, a color filter layer CFL, a black matrix layer BM, a first spacer PS1 and a common electrode CE. Wherein, the second substrate Sub2 has a second displaying area corresponding to the first displaying area and a second sensing area corresponding to the first sensing area. The color filter layer CFL is disposed on the second substrate Sub2 and is located at the second displaying area.

The black matrix layer BM is disposed on the second substrate Sub2, and a portion of the black matrix layer BM1 corresponds to the first active device T1, and another portion of the black matrix layer BM2 is located at the second sensing area. The first spacer (for example, a photo spacer) PS1 is disposed on the black matrix layer BM2 and is located at the second sensing area. The common electrode (with material thereof being ITO) CE covers the color filter layer CFL, a portion of the black matrix layer BM, and the first spacer PS1, wherein there is a pitch between the common electrode CE on the first spacer PS1 and the sensing electrode SE, so as to form a sensing capacitor SEC.

In the present embodiment, the liquid crystal layer 105 is disposed between the pixel electrode PE and the common electrode CE. The touch panel 100 further has a plurality of second spacers (for example, photo spacers) PS2 disposed between the active device array substrate 101 and the opposite substrate 103, and a height of the second spacer is generally a cell gap.

Figure 2:
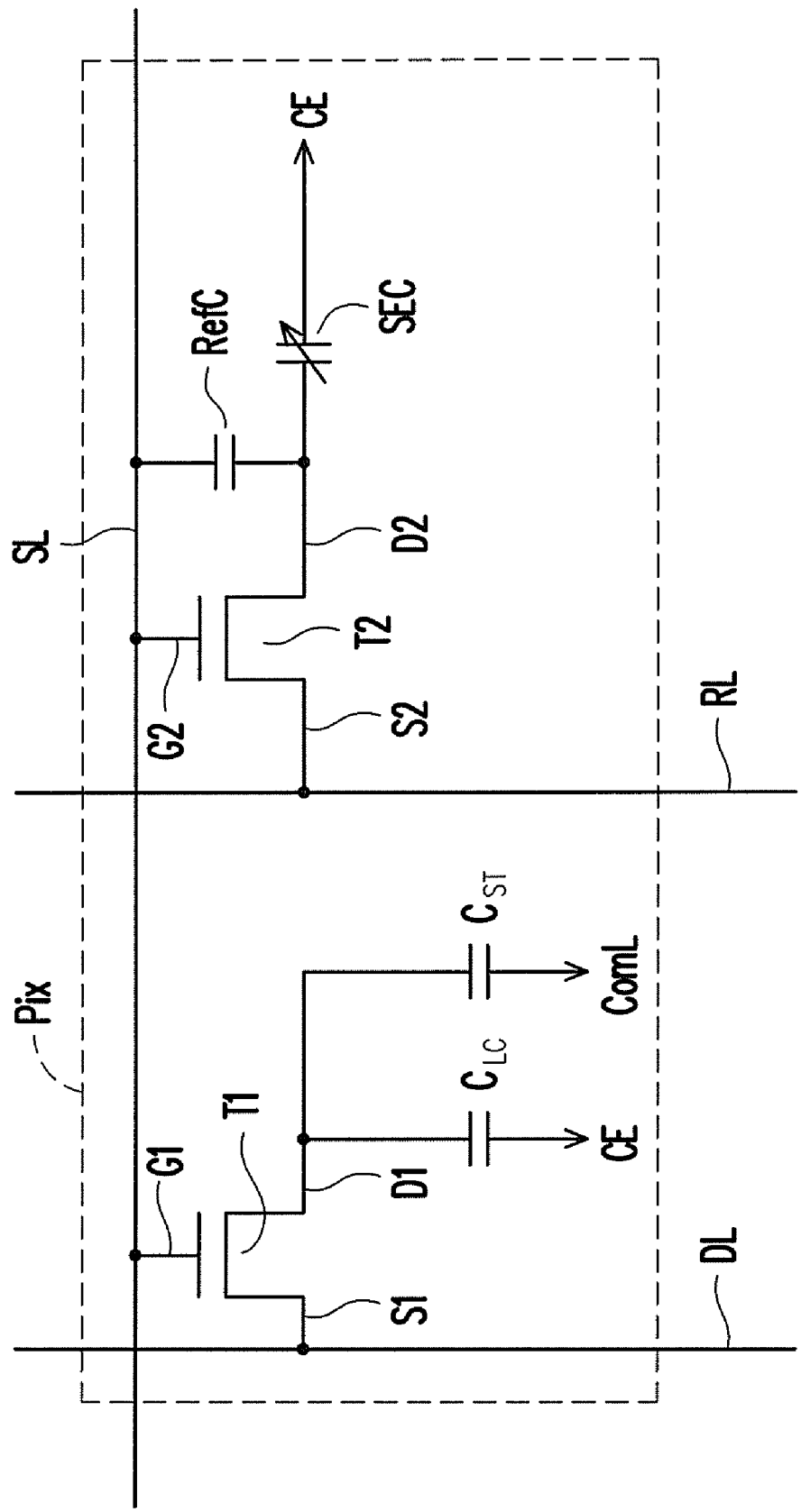
FIG. 2 is an equivalent pixel circuit diagram of a first pixel structure Pix of FIG. 1.

FIG. 2 is an equivalent pixel circuit diagram of the first pixel structure Pix of FIG. 1. Referring to FIG. 1 and FIG. 2, the equivalent pixel circuit of the first pixel structure Pix includes a first active device T1 (i.e. TFT), a liquid crystal capacitor $C_{LC}$, a storage capacitor $C_{ST}$, a second active device T2 (i.e. TFT), a reference capacitor RefC and a sensing capacitor SEC. The first active device T1 has a first gate G1, a first source S1 and a first drain D1. The first gate G1 is electrically connected to a scan line SL for receiving a scan signal, and the first source S1 is electrically connected to a data line DL for receiving a data signal (i.e. a pixel voltage).

The liquid crystal capacitor $C_{LC}$ is electrically connected between the common electrode CE and the first drain D1, i.e. the liquid crystal capacitor $C_{LC}$ is formed between the pixel electrode PE and the common electrode CE. The storage capacitor $C_{ST}$ is electrically connected between the common line ComL and the first drain D1, i.e. the storage capacitor $C_{ST}$ is formed between the pixel electrode PE and the common line ComL.

The second active device T2 has a second gate G2, a second source S2 and a second drain D2, wherein the second gate G2 is electrically connected to the scan line SL, and the second source S2 is electrically connected to a readout line RL. The reference capacitor RefC is electrically connected between the scan line SL and the second drain D2, i.e. the reference capacitor RefC is formed between a portion of the scan line SLP and the sensing electrode SE in the first sensing area. The sensing capacitor SEC is electrically connected between the second drain D2 and the common electrode CE, i.e. the sensing capacitor SEC is formed between the common electrode CE and the sensing electrode SE.

In the present embodiment, when a voltage value divided between the reference capacitor RefC and the sensing capacitor SEC of the first pixel circuit Pix is changed, it represents an area formed by M×N pixel structures/circuits where the first pixel circuit Pix is belonged is a touched position of the touch panel 100.

In detail, when a user uses a stylus or a finger to press the touch panel 100, since the touch panel 100 has at least one first pixel structure Pix in an area formed by each 6×4 pixel structures/circuits (the present invention is not limited to the data of 6×4), the space between the common electrode CE on the first spacer PS1 and the sensing electrode SE is compressed when the user presses the touch panel 100, so that a capacitance of the sensing capacitor SEC is changed accordingly. Therefore, the voltage value divided between the reference capacitor RefC and the sensing capacitor SEC of the first pixel circuit Pix is changed.

Accordingly, when a processor (not shown) of the touch panel 100 detects that the voltage value between the reference capacitor RefC and the sensing capacitor SEC of the first pixel circuit Pix in a certain area is changed via the readout line RL, the position touched by the user on the touch panel 100 is then determined.

Certainly, according to the spirit of the present invention, the present invention is not limited to the aforementioned embodiment. In the following content, other embodiments of the present invention are provided for those skilled in the art.

Figure 3:
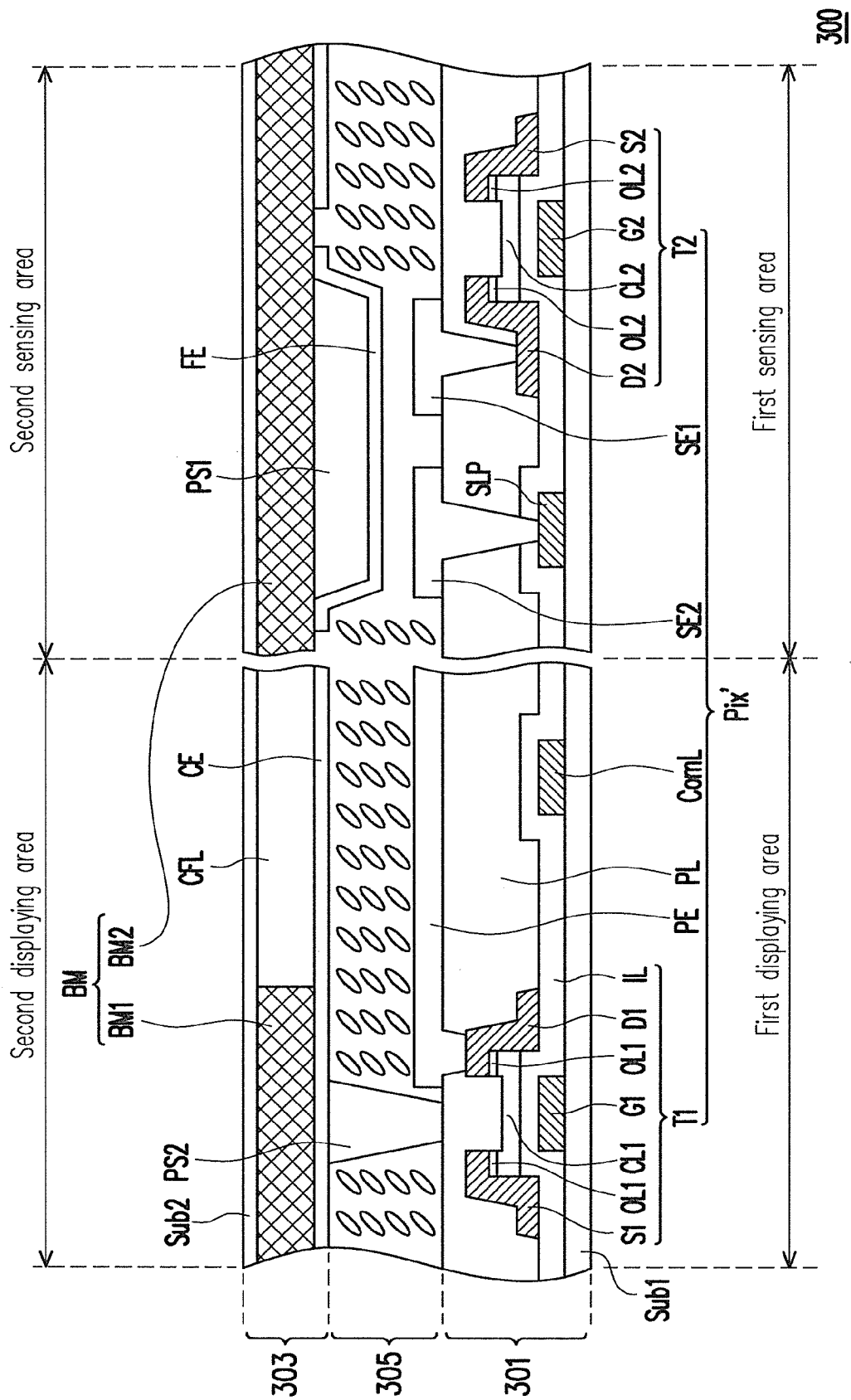
FIG. 3 is a cross-sectional view of a touch panel 300 according to a second embodiment of the present invention.

FIG. 3 is a cross-sectional view of a touch panel 300 according to a second embodiment of the present invention. Referring to FIG. 3, the touch panel 300 includes an active device array substrate (for example, the TFT array substrate) 301, an opposite substrate 303 and a liquid crystal layer 305. The active device array substrate 301 includes a first substrate Sub1 and a plurality of pixel structures. The pixel structures are generally arranged on the first substrate Sub1 in an array.

In the present embodiment, at least one first pixel structure Pix' in each M×N pixel structures has a first displaying area and a first sensing area, wherein M and N are positive integers, and the other pixel structures can only have the first displaying area, though the present invention is not limited thereto. For example, if a resolution of the touch panel 300 is assumed to be 1024×768, each 6×4 pixel structures is then assumed to have at least one first pixel structure Pix' shown as FIG. 3, and the first pixel structure Pix' is approximately disposed at a center of an area formed by the 6×4 pixel structures. However, the spirit of the present invention is not limited to the aforementioned assumptions, and the assumptions can be changed according to actual requirements.

The first pixel structure Pix' includes a first active device T1, a passivation layer PL, a pixel electrode PE, a second active device T2, a first sensing electrode SE1, a second sensing electrode SE2 and a common line ComL. Wherein, the first active device T1 is disposed on the first substrate Sub1 and is located at the first displaying area. The first active device T1 includes a first gate G1, an insulation layer IL, a first channel layer CL1, a first ohmic contact layer OL1, a first source S1 and a first drain D1. The first gate G1 is disposed on the first substrate Sub1 and is located at the first displaying area, and the first gate G1 is further electrically connected to a scan line (not shown).

The insulation layer IL covers the first gate G1, the scan line, a portion of the first substrate Sub1 and the common line ComL, wherein the common line ComL is disposed on the first substrate Sub1 and is located at the first displaying area. The first channel layer CL1 is disposed on the insulation layer IL covering the first gate G1. The first ohmic contact layer OL1 is disposed at two sides on the first channel layer CL1. In detail, the first ohmic contact layer OL1 is disposed between the first channel layer CL1 and the first source S1, and between the first channel layer CL1 and the first drain D1. The first source S1 is electrically connected to a data line (not shown), and the first drain D1 is electrically connected to the pixel electrode PE.

The passivation layer PL covers the first active device T1, and the pixel electrode PE is disposed on the passivation layer PL and is located at the first displaying area. The second active device T2 is disposed on the first substrate Sub1 and is located at the first sensing area. The second active device T2 is electrically connected to the scan line and a readout line (not shown), and the passivation layer PL also covers the second active device T2.

The first sensing electrode (with material thereof being ITO, for example) SE1 is disposed on the passivation layer PL and is located at the first sensing area. The first sensing electrode SE1 is electrically connected to the readout line through the second active device T2. The second sensing electrode (with material thereof being ITO, for example) SE2 is disposed on the passivation layer PL and is located at the first sensing area, and a portion of the scan line SLP is located between the first sensing area and the second sensing electrode SE2, and is electrically connected to the second sensing electrode SE2.

In the present embodiment, the second active device T2 includes a second gate G2, a second channel layer CL2, a second ohmic contact layer OL2, a second source S2 and a second drain D2. The second gate G2 is disposed on the first substrate Sub1 and is located at the first sensing area, and the second gate G2 is also electrically connected to the scan line, and the insulation layer IL also covers the second gate G2.

The second channel layer CL2 is disposed on the insulation layer IL covering the second gate G2. The second ohmic contact layer OL2 is disposed at two sides on the second channel layer CL2. In detail, the second ohmic contact layer OL2 is disposed between the second channel layer CL2 and the second source S2, and between the second channel layer CL2 and the second drain D2. The second source S2 is electrically connected to the readout line, and the second drain D2 is electrically connected to the first sensing electrode SE1.

The opposite substrate 303 includes a second substrate Sub2, a color filter layer CFL, a black matrix layer BM, a first spacer PS1, a common electrode CE and a floating electrode FE. Wherein, the second substrate Sub2 has a second displaying area corresponding to the first displaying area and a second sensing area corresponding to the first sensing area. The color filter layer CFL is disposed on the second substrate Sub2 and is located at the second displaying area. In the present embodiment, the floating electrode FE does not have any potential, and the material thereof can also be ITO.

The black matrix layer BM is disposed on the second substrate Sub2, and a portion of the black matrix layer BM1 corresponds to the first active device T1, and another portion of the black matrix layer BM2 is located at the second sensing area. The first spacer (for example, a photo spacer) PS1 is disposed on the black matrix layer BM2 and is located at the second sensing area.

The common electrode CE covers the color filter layer CFL and the black matrix layer BM1 located at the second displaying area. The floating electrode FE covers a portion of the black matrix layer located at the second sensing area (i.e. a portion of the black matrix layer BM2), and the first spacer PS1, wherein the floating electrode FE on the first spacer PS1 respectively has a same pitch relative to vertical directions of the first sensing electrode SE1 and the second sensing electrode SE2.

In the present embodiment, the liquid crystal layer 305 is disposed between the pixel electrode PE and the common electrode CE. The touch panel 300 further has a plurality of second spacers (for example, photo spacers) PS2 disposed between the active device array substrate 301 and the opposite substrate 303, and a height of the second spacer is generally the cell gap.

Figure 4:
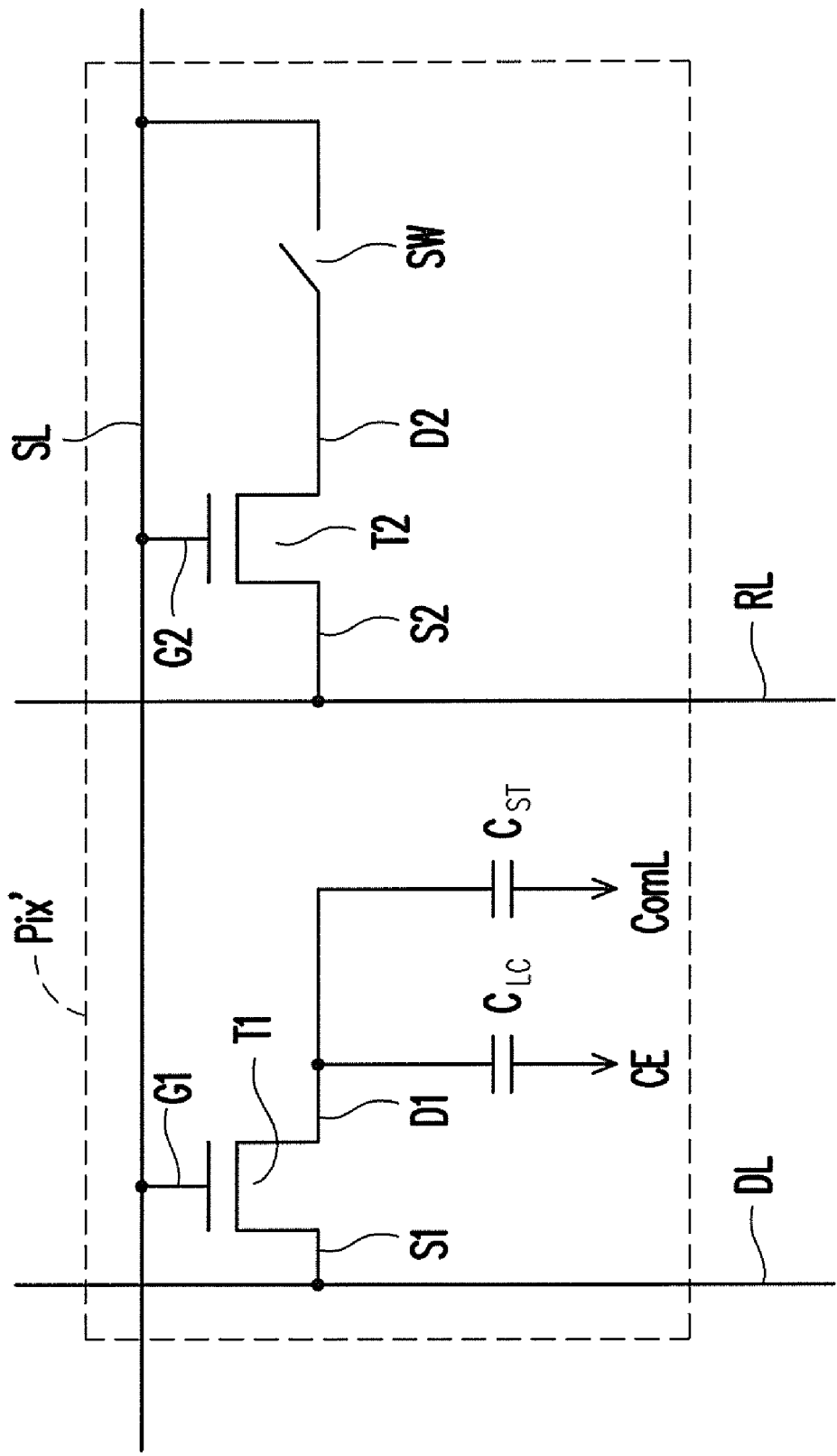
FIG. 4 is an equivalent pixel circuit diagram of a first pixel structure Pix' of FIG. 3.

FIG. 4 is an equivalent pixel circuit diagram of the first pixel structure Pix' of FIG. 3. Referring to FIG. 3 and FIG. 4, the equivalent pixel circuit of the first pixel structure Pix' includes a first active device T1 (i.e. TFT), a liquid crystal capacitor $C_{LC}$, a storage capacitor $C_{ST}$, a second active device T2 (i.e. TFT), and a switch SW. The first active device T1 has a first gate G1, a first source S1 and a first drain D1. The first gate G1 is electrically connected to a scan line SL for receiving a scan signal, and the first source S1 is electrically connected to a data line DL for receiving a data signal.

The liquid crystal capacitor $C_{LC}$ is electrically connected between the common electrode CE and the first drain D1, i.e. the liquid crystal capacitor $C_{LC}$ is formed between the pixel electrode PE and the common electrode CE. The storage capacitor $C_{ST}$ is electrically connected between the common line ComL and the first drain D1, i.e. the storage capacitor $C_{ST}$ is formed between the pixel electrode PE and the common line ComL.

The second active device T2 has a second gate G2, a second source S2 and a second drain D2, wherein the second gate G2 is electrically connected to the scan line SL, and the second source S2 is electrically connected to a readout line RL. One terminal of the switch SW is electrically connected to the second drain D2, and another terminal of the switch SW is electrically connected to the scan line SL. In the present embodiment, the switch SW is formed by the floating electrode FE on the first spacer PS1, and the first sensing electrode SE1 and the second sensing electrode SE2.

In the present embodiment, when the switch SW of the first pixel circuit Pix' is conducted, it represents an area formed by M×N pixel structures/circuits where the first pixel circuit Pix' is belonged is the touched position of the touch panel 300. In detail, when a user uses a stylus or a finger to press the touch panel 300, since the touch panel 300 has at least one first pixel structure Pix' in an area formed by each 6×4 pixel structures/circuits (the present invention is not limited to the data of 6×4), the common electrode CE on the first spacer PS1, and the first sensing electrode SE1 and the second sensing electrode SE2 are then touched when the user presses the touch panel 300.

Accordingly, when a processor (not shown) of the touch panel 300 detects that the switch SW of the first pixel circuit Pix' in a certain area is conducted via the readout line RL, a scan signal is obtained, so that the position touched by the user on the touch panel 300 is then determined.

Figure 5:
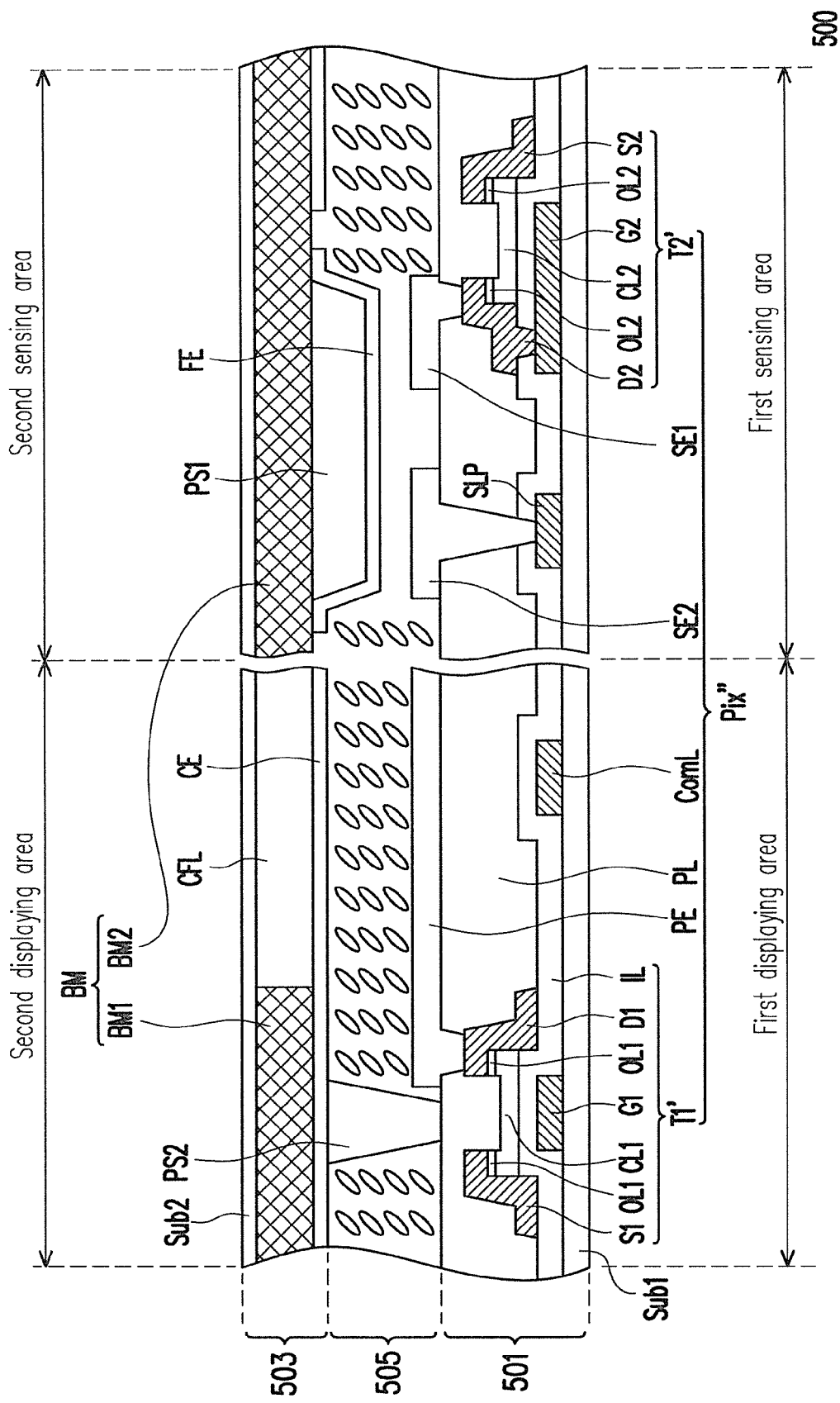
FIG. 5 is a cross-sectional view of a touch panel 500 according to a third embodiment of the present invention.

Besides, FIG. 5 is a cross-sectional view of a touch panel 500 according to a third embodiment of the present invention. Referring to FIG. 5, the touch panel 500 includes an active device array substrate (for example, the TFT array substrate) 501, an opposite substrate 503 and a liquid crystal layer 505. The active device array substrate 501 includes a first substrate Sub1 and a plurality of pixel structures. The pixel structures are generally arranged on the first substrate Sub1 in an array.

In the present embodiment, at least one first pixel structure Pix" in each M×N pixel structures has a first displaying area and a first sensing area, wherein M and N are positive integers, and the other pixel structures can only have the first displaying area, though the present invention is not limited thereto. For example, if a resolution of the touch panel 500 is assumed to be 1024×768, each 6×4 pixel structures is then assumed to have at least one first pixel structure Pix" shown as FIG. 5, and the first pixel structure Pix" is approximately disposed at a center of an area formed by the 6×4 pixel structures. However, the spirit of the present invention is not limited to the aforementioned assumptions, and the assumptions can be changed according to actual requirements.

The first pixel structure Pix" includes a first active device T1, a passivation layer PL, a pixel electrode PE, a second active device T2', a first sensing electrode SE1, a second sensing electrode SE2 and a common line ComL. Wherein, the first active device T1 is disposed on the first substrate Sub1 and is located at the first displaying area. The first active device T1 includes a first gate G1, an insulation layer IL, a first channel layer CL1, a first ohmic contact layer OL1, a first source S1 and a first drain D1. The first gate G1 is disposed on the first substrate Sub1 and is located at the first displaying area, and the first gate G1 is further electrically connected to a scan line (not shown).

The insulation layer IL covers the first gate G1, the scan line, a portion of the first substrate Sub1 and the common line ComL, wherein the common line ComL is disposed on the first substrate Sub1 and is located at the first displaying area. The first channel layer CL1 is disposed on the insulation layer IL covering the first gate G1. The first ohmic contact layer OL1 is disposed at two sides on the first channel layer CL1. In detail, the first ohmic contact layer OL1 is disposed between the first channel layer CL1 and the first source S1, and between the first channel layer CL1 and the first drain D1. The first source S1 is electrically connected to a data line (not shown), and the first drain D1 is electrically connected to the pixel electrode PE.

The passivation layer PL covers the first active device T1, and the pixel electrode PE is disposed on the passivation layer PL and is located at the first displaying area. The second active device T2' is disposed on the first substrate Sub1 and is located at the first sensing area. The second active device T2' is electrically connected to the scan line and a readout line (not shown), and the passivation layer PL also covers the second active device T2'.

The first sensing electrode SE1 is disposed on the passivation layer PL and is located at the first sensing area. The first sensing electrode SE1 is electrically connected to the readout line through the second active device T2'. The second sensing electrode SE2 is disposed on the passivation layer PL and is located at the first sensing area, and a portion of the scan line SLP is located between the first sensing area and the second sensing electrode SE2, and is electrically connected to the second sensing electrode SE2.

In the present embodiment, the second active device T2' includes a second gate G2, a second channel layer CL2, a second ohmic contact layer OL2, a second source S2 and a second drain D2. The second gate G2 is disposed on the first substrate Sub1 and is located at the first sensing area, and the second gate G2 is also electrically connected to the scan line, and the insulation layer IL also covers the second gate G2.

The second channel layer CL2 is disposed on the insulation layer IL covering the second gate G2. The second ohmic contact layer OL2 is disposed at two sides on the second channel layer CL2. In detail, the second ohmic contact layer OL2 is disposed between the second channel layer CL2 and the second source S2, and between the second channel layer CL2 and the second drain D2. The second source S2 is electrically connected to the readout line, and the second drain D2 is electrically connected to the first sensing electrode SE1 and the second gate G2.

The opposite substrate 503 includes a second substrate Sub2, a color filter layer CFL, a black matrix layer BM, a first spacer PS1, a common electrode CE and a floating electrode FE. Wherein, the second substrate Sub2 has a second displaying area corresponding to the first displaying area and a second sensing area corresponding to the first sensing area. The color filter layer CFL is disposed on the second substrate Sub2 and is located at the second displaying area.

The black matrix layer BM is disposed on the second substrate Sub2, and a portion of the black matrix layer BM1 corresponds to the first active device T1, and another portion of the black matrix layer BM2 is located at the second sensing area. The first spacer (for example, a photo spacer) PS1 is disposed on the black matrix layer BM2 and is located at the second sensing area.

The common electrode CE covers the color filter layer CFL and the black matrix layer BM1 located at the second displaying area. The floating electrode FE covers a portion of the black matrix layer located at the second sensing area (i.e. a portion of the black matrix layer BM2), and the first spacer PS1, wherein the floating electrode FE on the first spacer PS1 respectively has a same pitch relative to vertical directions of the first sensing electrode SE1 and the second sensing electrode SE2.

In the present embodiment, the liquid crystal layer 505 is disposed between the pixel electrode PE and the common electrode CE. The touch panel 500 further has a plurality of second spacers (for example, photo spacers) PS2 disposed between the active device array substrate 501 and the opposite substrate 503, and a height of the second spacer is generally the cell gap.

Figure 6:
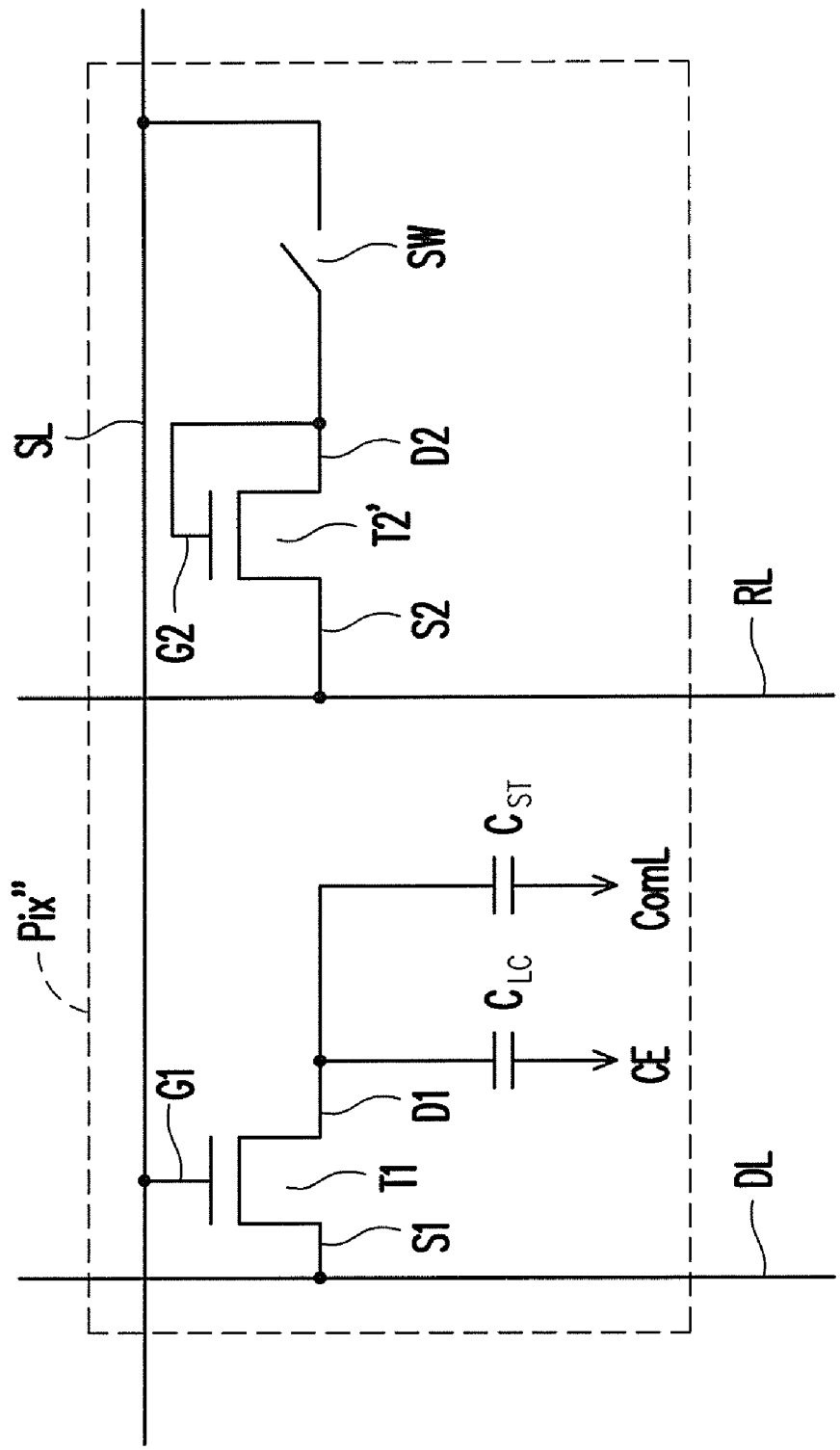
FIG. 6 is an equivalent pixel circuit diagram of a first pixel structure Pix" of FIG. 5.

FIG. 6 is an equivalent pixel circuit diagram of the first pixel structure Pix" of FIG. 5. Referring to FIG. 5 and FIG. 6, the equivalent pixel circuit of the first pixel structure Pix" includes a first active device T1 (i.e. TFT), a liquid crystal capacitor $C_{LC}$, a storage capacitor $C_{ST}$, a second active device T2' (i.e. TFT), and a switch SW. The first active device T1 has a first gate G1, a first source S1 and a first drain D1. The first gate G1 is electrically connected to a scan line SL for receiving a scan signal, and the first source S1 is electrically connected to a data line DL for receiving a data signal.

The liquid crystal capacitor $C_{LC}$ is electrically connected between the common electrode CE and the first drain D1, i.e. the liquid crystal capacitor $C_{LC}$ is formed between the pixel electrode PE and the common electrode CE. The storage capacitor $C_{ST}$ is electrically connected between the common line ComL and the first drain D1, i.e. the storage capacitor $C_{ST}$ is formed between the pixel electrode PE and the common line ComL.

The second active device T2' has a second gate G2, a second source S2 and a second drain D2, wherein the second gate G2 is electrically connected to the second drain D2, and the second source S2 is electrically connected to a readout line RL. One terminal of the switch SW is electrically connected to the second drain D2, and another terminal of the switch SW is electrically connected to the scan line SL. In the present embodiment, the switch SW is also formed by the floating electrode FE on the first spacer PS1, and the first sensing electrode SE1 and the second sensing electrode SE2.

In the present embodiment, when the switch SW of the first pixel circuit Pix" is conducted, it represents an area formed by M×N pixel structures/circuits where the first pixel circuit Pix" is belonged is the touched position of the touch panel 500. In detail, when a user uses a stylus or a finger to press the touch panel 500, since the touch panel 300 has at least one first pixel structure Pix" in an area formed by each 6×4 pixel structures/circuits (the present invention is not limited to the data of 6×4), the common electrode CE on the first spacer PS1, and the first sensing electrode SE1 and the second sensing electrode SE2 are then touched when the user presses the touch panel 500.

Accordingly, when a processor (not shown) of the touch panel 500 detects that the switch SW of the first pixel circuit Pix" in a certain area is conducted via the readout line RL, a scan signal is obtained, so that the position touched by the user on the touch panel 500 is then determined.

Accordingly, any of the aforementioned touch panels 100, 300 and 500 can be applied to portable electronic devices having the touch panels, such as PDA mobile phones and handheld game boxes, etc.

In summary, according to the present invention, a conventional charge readout amplifier is not required in any of the touch panels provided by the present invention, and a position touched by an user on the touch panel can be accurately determined only by judging whether or not a voltage value between a reference capacitor and a sensing capacitor of a pixel having a sensing area is changed, or whether or not a switch of the pixel having the sensing area is conducted. Therefore, the touch panel provided by the present invention can not only effectively resolve disadvantages of the conventional touch panel, but also the potable electronic device using any of the touch panels provided by the present invention has the design features of lightness, slimness, shortness and smallness, so that competitiveness of the products is improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A touch panel, comprising:
   a first substrate;
   a plurality of pixel structures, arranged on the first substrate in an array, wherein at least one first pixel structure in each M×N pixel structures comprises a first sensing area, where M and N are positive integers, and the first pixel structure comprises:
      an active device, disposed on the first substrate and located at the first sensing area, wherein the active device is electrically connected to a scan line and a readout line, and is covered by a passivation layer;
      a first sensing electrode, disposed on the passivation layer and located at the first sensing area, wherein the first sensing electrode is electrically connected to the readout line through the active device; and
      a second sensing electrode, disposed on the passivation layer and located at the first sensing area, wherein a portion of the scan line is located between the first sensing area and the second sensing electrode, and is electrically connected to the second sensing electrode;
   a second substrate, having a second sensing area corresponding to the first sensing area;
   a black matrix layer, disposed on the second substrate and located at the second sensing area;
   a spacer, disposed on the black matrix layer and located at the second sensing area; and
   a floating electrode, covering a portion of the black matrix layer located at the second sensing area and the spacer, wherein the floating electrode on the spacer respectively has a same pitch relative to vertical directions of the first sensing electrode and the second sensing electrode.

2. The touch panel as claimed in claim 1, wherein the active device comprises:
   a gate, disposed on the first substrate and located at the first sensing area, wherein the gate is electrically connected to the scan line, and is covered by an insulation layer;
   a channel layer, disposed on the insulation layer covering the gate;
   an ohmic contact layer, disposed at two sides on the channel layer;
   a source, wherein the ohmic contact layer is disposed between the channel layer and the source, and the source is electrically connected to the readout line; and
   a drain, wherein the ohmic contact layer is disposed between the channel layer and the drain, and the drain is electrically connected to the first sensing electrode.

3. The touch panel as claimed in claim 1, wherein the active device comprises:
   a gate, disposed on the first substrate and located at the first sensing area, wherein the gate is electrically connected to the scan line, and a portion of the gate is covered by an insulation layer;
   a channel layer, disposed on the insulation layer covering the gate;

an ohmic contact layer, disposed at two sides on the channel layer;
a source, wherein the ohmic contact layer is disposed between the channel layer and the source, and the source is electrically connected to the readout line; and
a drain, wherein the ohmic contact layer is disposed between the channel layer and the drain, and the drain is electrically connected to the first sensing electrode and the gate.

4. A portable electronic apparatus having a touch panel as claimed in claim 1.

5. A touch panel, comprising:
a plurality of pixel circuits arranged in an array, wherein at least one first pixel circuit in each M×N pixel circuits comprises:

an active device, having a gate, a source and a drain, wherein the gate is electrically connected to a scan line, and the source is electrically connected to a readout line; and
a switch, having one terminal electrically connected to the drain, and another terminal electrically connected to the scan line,
wherein when the switch is conducted, it represents an area formed by the M×N pixel circuits is a touched position of the touch panel, and M and N are positive integers.

6. A portable electronic apparatus having a touch panel as claimed in claim 5.

* * * * *